(No Model.) 2 Sheets—Sheet 1.

M. V. T. DUBREUIL.
BALL BEARING DEVICE.

No. 550,100. Patented Nov. 19, 1895.

Witnesses:
D. W. Gardner.
E. H. van Vleet.

Inventor:
Marie Victor Theodore Dubreuil.
by William H. Clarkson
Attorney.

(No Model.) 2 Sheets—Sheet 2.
M. V. T. DUBREUIL.
BALL BEARING DEVICE.
No. 550,100. Patented Nov. 19, 1895.
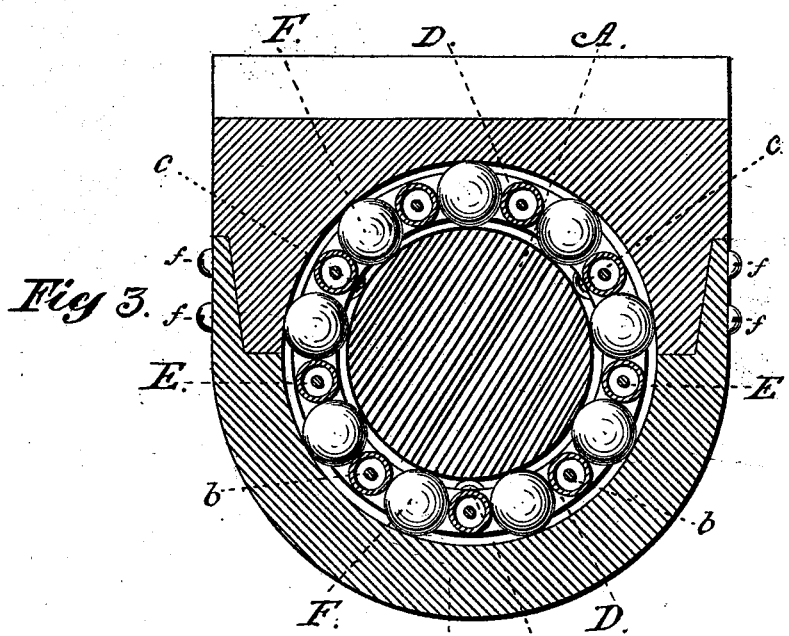
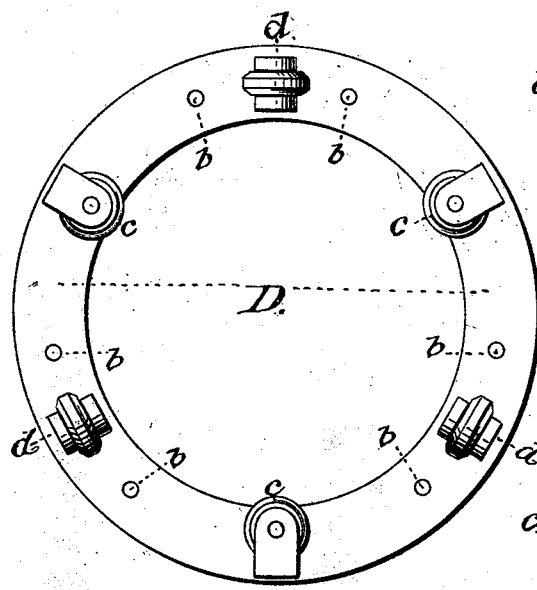
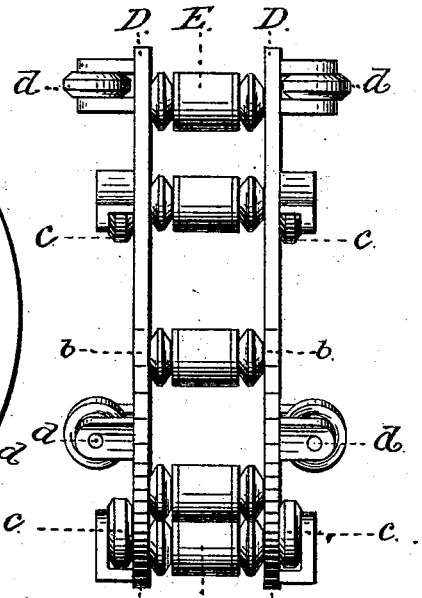
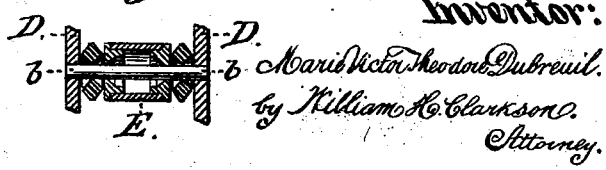
Witnesses: Inventor:
Marie Victor Theodore Dubreuil.
by William H. Clarkson.
Attorney.

UNITED STATES PATENT OFFICE.

MARIE VICTOR THEODORE DUBREUIL, OF NEW YORK, N. Y., ASSIGNOR TO HOWARD J. DIETZ, OF SAME PLACE.

BALL-BEARING DEVICE.

SPECIFICATION forming part of Letters Patent No. 550,100, dated November 19, 1895.

Application filed May 3, 1895. Serial No. 547,962. (No model.)

*To all whom it may concern:*

Be it known that I, MARIE VICTOR THEODORE DUBREUIL, a citizen of the United States, residing in New York city, in the county and State of New York, have invented a new and useful Improvement in Ball-Bearing Devices, of which the following is a specification.

The object of my invention is to reduce friction in ball-bearings, and I attain this object by means of the mechanism illustrated in the accompanying drawings, in which—

Figure 1:
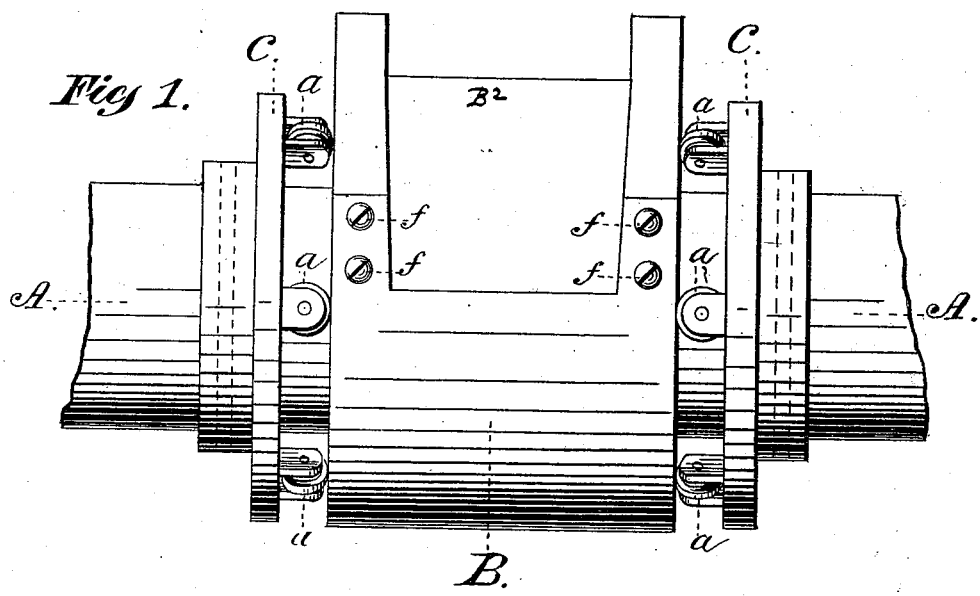
Figure 2:
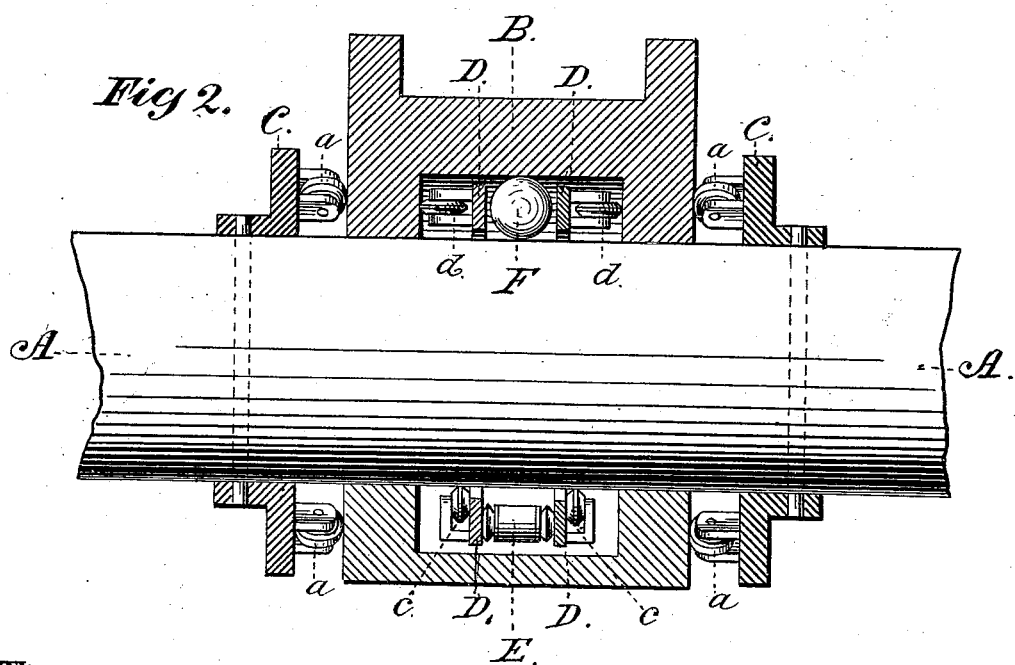

Figure 1 is an elevational view of my device affixed to the axle of a wagon. Fig. 2 shows a longitudinal section of the same. Fig. 3 is a cross-sectional view cut through the center of Fig. 1. Fig. 4 is a side view of a loose double ring inside the device which holds the bearing-balls and revolving cylinders hereinafter described in their places. Fig. 5 is an end view of the double ring held together by cylinders which are smaller in diameter than the balls. Fig. 6 is a longitudinal sectional view of one of the cylinders.

Similar letters refer to similar parts throughout the several views.

A is an axle upon which B, the box containing the operating portion of the device, revolves. $B^2$ is the cover of said box.

C represents collars provided with wheels $a$, designed to keep the device in place on the axle.

D is the loose double ring inclosed in the box and into which are journaled the cylinders E, designed to revolve upon shafts $b$, fixed in said ring.

F are balls loosely confined in the chambers between the revolving cylinders and which bear upon the shaft or axle A and the cover of the box, and they are forced to turn in the required direction by contact with the revolving cylinders.

$c$ are wheels affixed to the double ring, as shown, and which bear upon the shaft A to sustain the ring and enable it to revolve easily around the shaft in any direction.

$d$ are wheels affixed to the sides of the ring to bear against the interior walls of the box to keep the ring in its proper position therein.

The cover of the box can readily be removed by withdrawing the screws $f\ f$.

In operation only the balls and the wheels which sustain the weight of the ring bear upon the shaft, and contact between the balls and cylinders actuates all the balls in one direction and the cylinders in the opposite one, thereby assisting one another in their revolutions and securing harmony of action.

My invention can be easily applied to pulleys, journals, spindles, shafting, &c.

In light wagon and buggy bearings the collar C may be dispensed with and nuts and washers substituted.

Having thus described my invention, what I claim as new, and desire to secure by Letters Patent, is—

1. The combination of the box B and collars C, with the loose double ring D, wheels $c$ and $d$, journaled cylinders E and balls F, bearing and operating between the cylinders substantially as shown and described and for the purposes set forth.

2. In ball bearings, the combination of a loose double ring provided with wheels and revolving cylinders journaled therein and the balls F, operating between the cylinders substantially as above set forth and described.

In testimony that I claim the foregoing as my invention I have signed my name, in presence of two witnesses, this 17th day of April, 1895.

MARIE VICTOR THEODORE DUBREUIL.

Witnesses:
WM. WISEMAN,
C. A. SMITH, Jr.